US00RE35055E

United States Patent [19]

Paquet et al.

[11] E Patent Number: Re. 35,055

[45] Reissued Date of Patent: Oct. 10, 1995

[54] DISC BRAKE ASSEMBLY

[76] Inventors: J. Jacques Paquet, 682 12i`eme Avenue, Thetford Mines, Quebec, Canada, G6G 7T9; Claude Rancourt, 1400 54i`eme Rue Nord, St. Georges Ouest, Beauce County, Quebec, Canada, G5Y 2E1

[21] Appl. No.: 197,714

[22] Filed: Feb. 17, 1994

Related U.S. Patent Documents

Reissue of:

[64] Patent No.: 5,205,380
Issued: Apr. 27, 1993
Appl. No.: 719,130
Filed: Jun. 20, 1991

U.S. Applications:

[63] Continuation-in-part of Ser. No. 552,184, Jul. 13, 1990, abandoned.

[51] Int. Cl.[6] ..... B60T 1/06

[52] U.S. Cl. ..... 188/18 A; 188/72.6; 188/106 F; 188/170

[58] Field of Search ..... 188/170, 18 A, 188/72.6, 106 F, 71.7; 303/71; 267/177

[56] References Cited

U.S. PATENT DOCUMENTS

| | | | |
|---|---|---|---|
| 2,992,705 | 7/1961 | Chisnell et al. | 188/72 |
| 3,547,234 | 12/1970 | Cummins | 188/170 |
| 3,556,272 | 1/1971 | Jones | 188/170 X |
| 3,559,772 | 2/1971 | Grombka | 188/170 |
| 3,830,345 | 8/1974 | Boyles | 188/72.5 |
| 3,893,549 | 7/1975 | Bennett | 188/170 |
| 3,946,837 | 3/1976 | Houser . | |
| 3,974,896 | 8/1976 | Rach | 188/170 X |
| 4,057,297 | 11/1977 | Beck et al. | 188/170 X |
| 4,078,637 | 3/1978 | Hanks | 188/170 |
| 4,478,319 | 10/1984 | Casalone et al. | 188/170 |
| 4,638,894 | 1/1987 | Sitabkhan et al. | 188/170 |
| 4,820,946 | 4/1989 | Gutbrod | 188/71.7 X |
| 4,890,699 | 1/1990 | Meggison et al. | 188/18 A |

FOREIGN PATENT DOCUMENTS

| | | |
|---|---|---|
| 1112189 | 11/1981 | Canada . |
| 1140486 | 2/1983 | Canada . |
| 1148099 | 6/1983 | Canada . |
| 38370 | 10/1981 | European Pat. Off. . |
| 300756 | 1/1989 | European Pat. Off. . |
| 1145869 | 9/1959 | Germany . |

*Primary Examiner*—Robert J. Oberleitner
*Assistant Examiner*—Lee W. Young

[57] ABSTRACT

In a disc brake for a heavy road vehicle there is provided a mechanically preloaded brake assembly which includes brake housing, a median wall in the brake housing parallel to the disc which is also in the housing. The disc is mounted to the adapter sleeve of the wheel, and the housing is mounted to an annular ring mounted to an axle of the vehicle. A pressure plate is provided within the housing and located between the annular intermediate wall and the housing wall opposite from the disc and is parallel thereto. The brake lining ring including a backing plate is provided adjacent a radial friction surface of the disc, and push rods extend between the pressure plate and the backing plate of the brake lining ring. A spring extends between the housing wall and the pressure plate urging the pressure plate and the brake lining ring against the friction surface of the disc, and a pneumatic bladder is provided between the pressure plate and the annular intermediate wall in order to overcome the urging of the spring when pneumatic pressure is supplied within the bladder.

18 Claims, 3 Drawing Sheets

DISC BRAKE ASSEMBLY

Matter enclosed in heavy brackets [ ] appears in the original patent but forms no part of this reissue specification; matter printed in italics indicates the additions made by reissue.

[CROSS-REFERENCE TO RELATED APPLICATION

This application is a continuation-in-part of application Ser. No. 07/552,184, filed Jul. 13, 1990 now abandoned.]

BACKGROUND OF THE INVENTION

1. Field of the Invention

The present invention relates to a vehicle brake system, more particularly, to a disc brake for large road vehicles, such as tractors and trailers, using existing pneumatic or air systems.

2. Description of the Prior Art

Canadian Patents 1,112,189, issued Nov. 10, 1981 and 1,140,486, issued Feb. 1, 1983, and U.S. Pat. No. 4,102,438, issued Jul. 25, 1978, Yvon Rancourt, which are incorporated herein by reference, describe a disc brake for heavy road vehicles wherein the brake shoes are in contact with the much larger disc area, and a suitable brake cooling system is provided to cool the disc, thus making disc brakes practical for such vehicles. The present invention is an improvement over the above-mentioned patent.

There are braking systems available on various types of vehicles which includes a positive mechanical brake of the type known as a fail-safe brake, that is, where the brakes are applied when pressure is released from the brakes. U.S. Pat. No. 3,547,234, Cummins, Dec. 15, 1970, describes a service brake for earthmoving trucks or tractors which includes a hydraulic brake system using a plurality of discs, and these discs are mechanically preloaded by a spring to provide a fail-safe brake. U.S. Pat. No. 4,057,297, Nov. 8, 1977, Beck et al, includes a brake system which has been preloaded by means of a spring, including the discs of the type described in the Cummins Patent. This pressurized air operated system uses a series of valves to modify the pressure exerted on the torque converter in order to avoid damage to the differential. This is a system that is utilized in very heavy machinery such as tractors, etc. These patents represent the state of the art in terms of fail-safe type brake systems using preloaded mechanical devices such as springs. The structures are complicated by the need to be adapted on heavy vehicles. What is required is a fail-safe type brake system of simple construction using pneumatic pressure for releasing the brakes and utilizing a simple disc brake construction of the type described in the Rancourt Patent wherein the disc is mounted to the adapter sleeve of a wheel on the vehicle and the brake housing is mounted to the vehicle on a dead axle.

SUMMARY OF THE INVENTION

It is an aim of the present invention to provide a disc brake for heavy road vehicles which relies on mechanical means for applying or actuating the brakes.

It is a further aim of the present invention to provide automatic security in the event of a malfunction in the braking system or parking brake.

It is a further aim of the present invention to provide a parking brake integrated with the disc brake assembly within the same housing in order to free up the axle.

A construction in accordance with the present invention includes a disc brake assembly for a vehicle wheel on a vehicle, wherein the wheel includes a hub journaled through a wheel mounting means on the vehicle. The brake assembly includes a housing mounted to the vehicle and a radial disc within the housing mounted to the wheel. The disc has at least one radial planar friction surface, and a brake shoe is provided adjacent the planar friction surface movable axially towards and away from the friction surface of the disc for friction engagement therewith and release thereof. Means are provided for restraining the brake shoe means from routing with the disc. An intermediate wall member is mounted within the housing and is fixed thereto, parallel with the radial disc friction surface, and located such that the brake shoe means moves between the intermediate wall and the radial disc. A movable plate means is mounted for axial movement within the housing between the intermediate wall and a housing wall, such that the intermediate wall is between the movable plate means and the brake shoe means. Rigid link members extend between the plate means and the brake shoe means through the intermediate wall such that the plate means moves in unison, axially with the brake shoe means. Spring means extend between the housing wall and the plate means such that the spring continually urges against the plate means to press the brake shoe assembly means against the friction surface of the disc. A pneumatic bladder means is provided between the intermediate wall and the plate means whereby the bladder, when expanded, forces the plate means to overcome the spring means to release the brake shoe means from the friction surface of the disc.

In a more specific embodiment of the present invention, the brake shoe assembly means includes a backing plate mounting the brake shoes, and the backing plate extends parallel to the intermediate wall and is in direct contact with the link members. A second pneumatic bladder is provided between the backing plate and the intermediate wall such that, when the brakes are being actively applied, pneumatic pressure is applied to expand and the second bladder such as to actively urge the brake shoe assembly means against the friction surface of the disc and supplementing the action of the spring against the movable plate means. While the second bladder is being inflated, the first bladder is deflated In a more specific embodiment of the present invention, the radial disc is provided with a second radial friction surface on the other side of the disc to the friction surface, and a second brake shoe means is mounted within the housing adjacent the second friction surface of the disc, and the disc is mounted to the wheel through an adapter sieve by means of axial splines such that the disc is capable of slight axial movement. The second bladder could alternatively be mounted between a backing plate for the second brake shoe means and the housing.

In a more specific embodiment, the intermediate wall member is mounted to a radial mounting plate mounted to the wheel mounting means of the vehicle, and the housing is fixedly mounted to the mounting plate.

In a still more specific embodiment of the present invention, the housing means is an annular housing provided with a central axial opening through which an axle forming part of the wheel mounting means of the vehicle extends therethrough, and the mounting plate is an annular ring mounted to the axle while the disc is an annular disc mounted on axial splines of an adapter sleeve projection extending from the wheel through a central opening of the disc.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
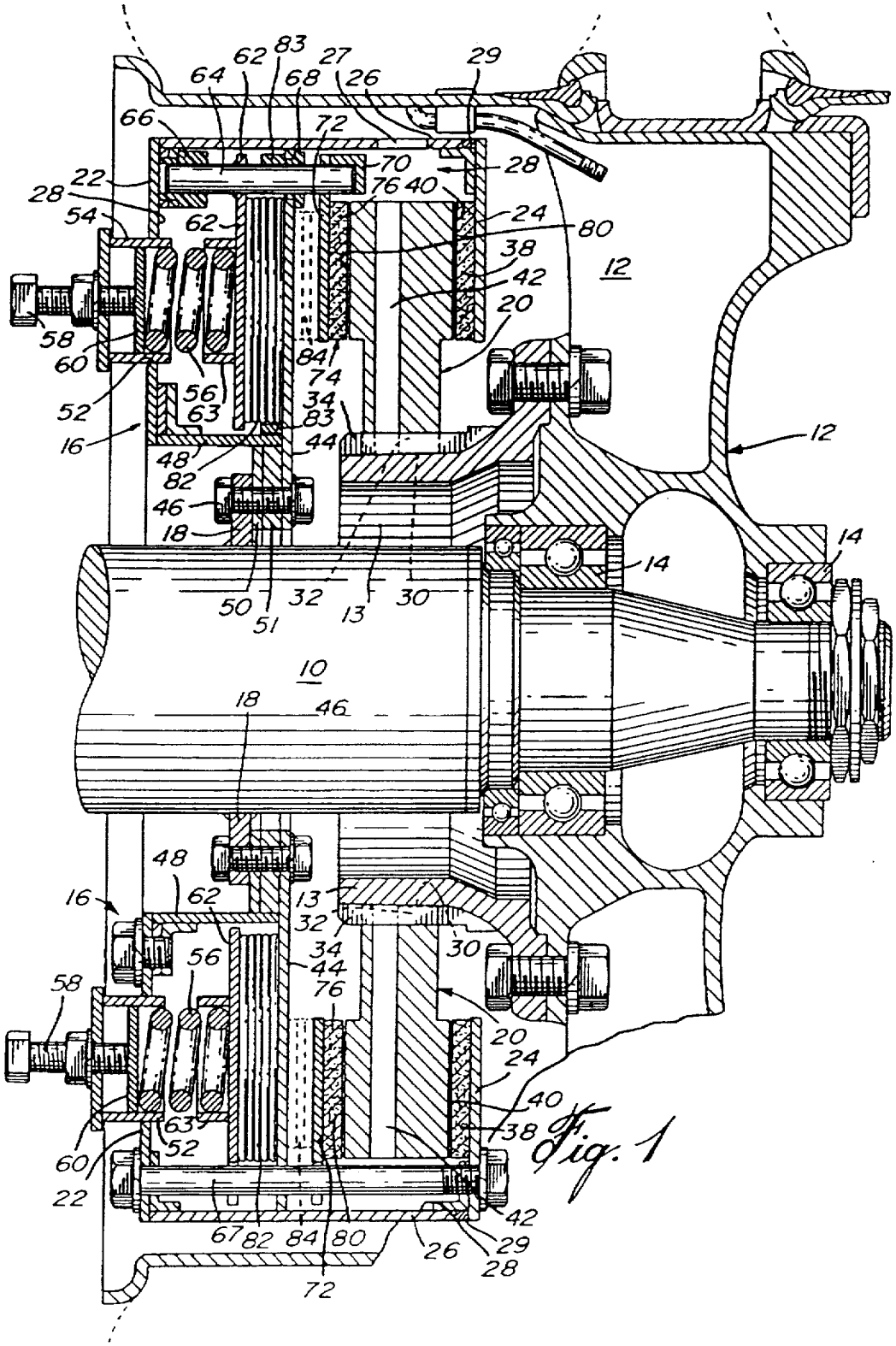
FIG. 1 is an axial fragmentary cross-section of an embodiment of the present invention.

Referring to the embodiment shown in FIG. 1, a vehicle having an axle 10 is illustrated to which a wheel 12 is journaled on the bearings 14. An adapter sleeve 13 is fixed to the hub of wheel 12. A disc brake housing 16 is mounted to the axle 10 by means of an annular mounting ring 18. A ventilated disc 20 is mounted for rotative movement integrally with the adapter sleeve 13 bolted on wheel 12.

More specifically, the housing 16 includes an annular enclosed shell having radial walls 22 and 24 with a circumferential wall 26 defining a housing cavity 28. Ventilation openings 27 are spaced apart peripherally therein.

The ventilated disc 20 is of the type described in Canadian Patent No. 1,140,486 and includes a central opening 30 having teeth 32 which engage within axial splines 34 on the adapter sleeve 13 to permit a limited axial movement of the disc 20 as will be described later.

Ventilation channels 42 extend generally radially of the disc 20. A plurality of brake shoe lining segments 38 forming a lining ring are mounted to wall 24 adjacent the radial friction surface 40. The segments 38 could be mounted to a backing plate (not shown).

An annular intermediate wall 44 is directly mounted to the ring 18 by means of a plurality of bolts 46. A cylindrical wall 48 mounts the housing wall 22 to the housing ring 50 and segmental ring 51. This housing assembly including walls 48, 22, 44, 26, and 24, and rings 50 and 51, are mounted to the ring 18 by means of a plurality of bolts 46.

Openings 52 are spaced apart annularly about the wall 22, and individual cylinders 54 are located in each of these openings 52. Each cylinder 54 receives a spring 56 which can be displaced axially by means of an adjustment pusher screw 58 acting against plate 60 to set the spring length either to provide a greater pushing force or to release the spring 56.

A movable annular plate 62 is provided within the housing and includes seats 63 for receiving the other end of the springs 56. The spring 56 thus urges against the movable plate 62. A plurality of push rods 64 are fixed at spaced-apart locations to the movable plate 62, and each travels in a bushing 66 mounted to the housing wall 22 and a bushing 68 mounted to the intermediate wall 44.

The push rods 64 are each received in a mounting cap 70 located peripherally on the brake shoe backing plate 72 of the brake shoe assembly 74. The brake shoe assembly 74, in addition to including an annular radial backing 72, includes a plurality of brake shoe segments forming lining ring 76 or a one-piece lining ring. This brake lining ring 76 is located adjacent the radial friction surface 80 of the disc 20.

A wear compensating ring 29 is provided between walls 26 and 24. This ring 29 may be removed when the disc 20 and/or the brake lining rings 76 and 38 have been worn in order to reduce the distance between brake linings 38 and 76. Wear compensation will be obtained by adjusting the spring length of springs 56 as described above and the wear compensating ring 29.

An annular flexible pneumatic bladder 82 is located between the movable plate 62 and the stationary intermediate wall 44. Pneumatic pressure supply means, not shown, including an inlet and an outlet, would be suitably connected to the bladder 82. Stoppers 83 are provided on the wall 44 adjacent the bladder 82 to prevent the bladder from being accidentally crushed.

When the vehicle is not in operation, the springs 56 urge against the movable plates 62 which in turn press the brake shoe backing plate 72 by means of push rods 64 and thus the brake shoe lining ring against the friction surface 80. The pressure from the brake shoe assembly 74 moves the disc 20 axially, such that the friction surface 40 engages the stationary brake shoe segments 38 on wall 24.

The springs 56 provide a security or parking brake for the vehicle which would typically be a truck, tractor, or trailer. Once the truck is in operation and the brakes are to be released, air pressure would be supplied to the bladder 82, thereby moving the movable plate 62 to overcome the spring 56 and thus retract brake shoe backing plate 72 and brake lining ring 76 from the disc 20, allowing the wheel to rotate freely.

In a more sophisticated version of the present embodiment as shown in FIG. 1, a second annular bladder 84 would be provided between the stationary intermediate wall 44 and the brake shoe backing plate 72. Thus, when it would be necessary to apply the brakes actively during operation, air pressure would be reduced from the bladder 82 and applied within the bladder 84, thus supplementing the spring 56 to apply the brake shoes against the disc 20. In the event of an air pressure failure, the springs 56 would overcome the bladder 82 pressing the brake shoes against disc 20. Thus, the brake assembly operates as a safety brake.

Figure 2:
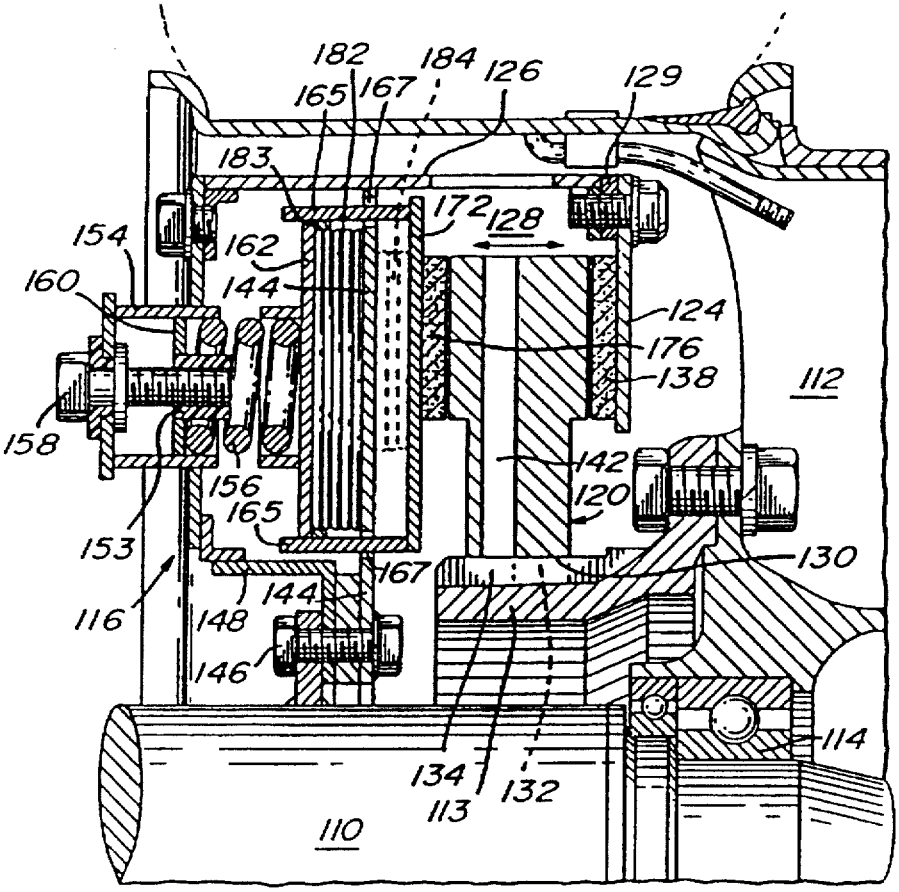
FIG. 2 is an axial fragmentary cross-section, similar to FIG. 1, taken of another embodiment of the present invention.
Figure 3:
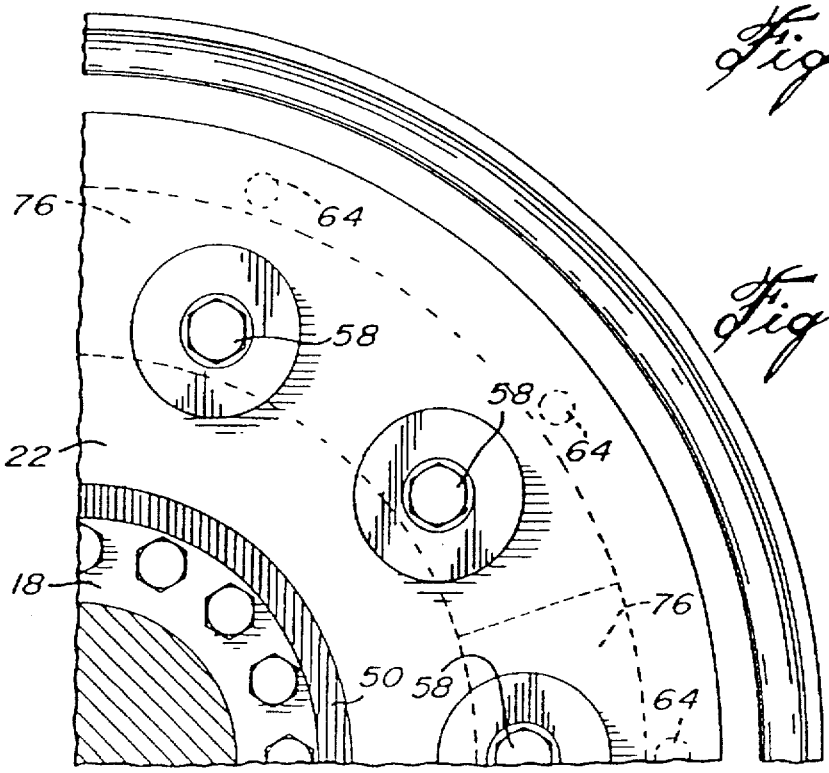
FIG. 3 is a fragmentary radial section of the embodiment shown in FIG. 1.

In the embodiment shown in FIG. 2, like elements have been raised by 100, and unless necessary, they will not be repeated.

Thus, in housing 116, the movable plate 162 and the brake shoe backing plate 172 are connected directly by means of rigid links 165 which pass through openings 167 in the stationary intermediate wall 144. Thus, the movable plate 162 and integral links 165 form an annular cage which moves axially relative to the stationary wall 144, pushing against backing plate 172.

The cylinder 154 mounts an adjustment stationary screw 158 which is threaded in a sleeve 153 for adjusting the length of the spring. Thus, the sleeve 153 and plate 160 can be moved axially to either decrease the spring length or to release it to a free position. Wear compensation ring 129 is also provided for the purpose of adjusting for fining and disc wear in combination with the spring length adjustment. The wear compensation ring 129 can replace the need for an adjustment screw. The compensating ring 129 need merely be removed from the housing 116 to reduce the distance between the backing plate 172 and homing wall 124, thus compensating for the wear on the linings 138 and 176 as well as the disc 120.

The bladders 182 and 184 would be interconnected by suitable valves to allow air to pass from bladder 182 to bladder 184 when it is necessary to apply the brakes. The valve would be closed when air is required in bladder 182 in order to release the brakes, causing bladder 184 to exhaust to atmosphere. The bladders could also be operated independently rather than being interconnected.

The operation of this embodiment is similar to that described in FIG. 1.

In the embodiment shown in FIG. 4, the push screw is replaced by a bladder 290 as will be described. In this embodiment, plate 223 is provided with integral posts 223*a*, which slide in bushings 266 mounted to the circumferential wall 226. The bushings 266 prevent posts 223*a* from jamming and thus plate 262 to slide parallel to wall 244. These posts 223*a* engage against the movable plate 262 forming part of a cage with the pins 264.

The spring length of spring 256 is determined by the distance between plate 223 and 262. A bladder 290 is provided between plate 223 and housing wall 222 which is bolted to the housing walls 226 and 248, as shown. The bladder 290 may be oil or grease filled or operated with air pressure. In either case, the increase of the volume in the bladder will tend to distance the plate 223 from the wall 222, thereby shortening the spring length 256. When the posts 223*a* have engaged the plate 262, the bladder 290 may be used to compensate for brake disc or lining wear by pressing the plate 223 and posts 223*a* against the cage formed by plate 262 and pins 264.

Figure 4:
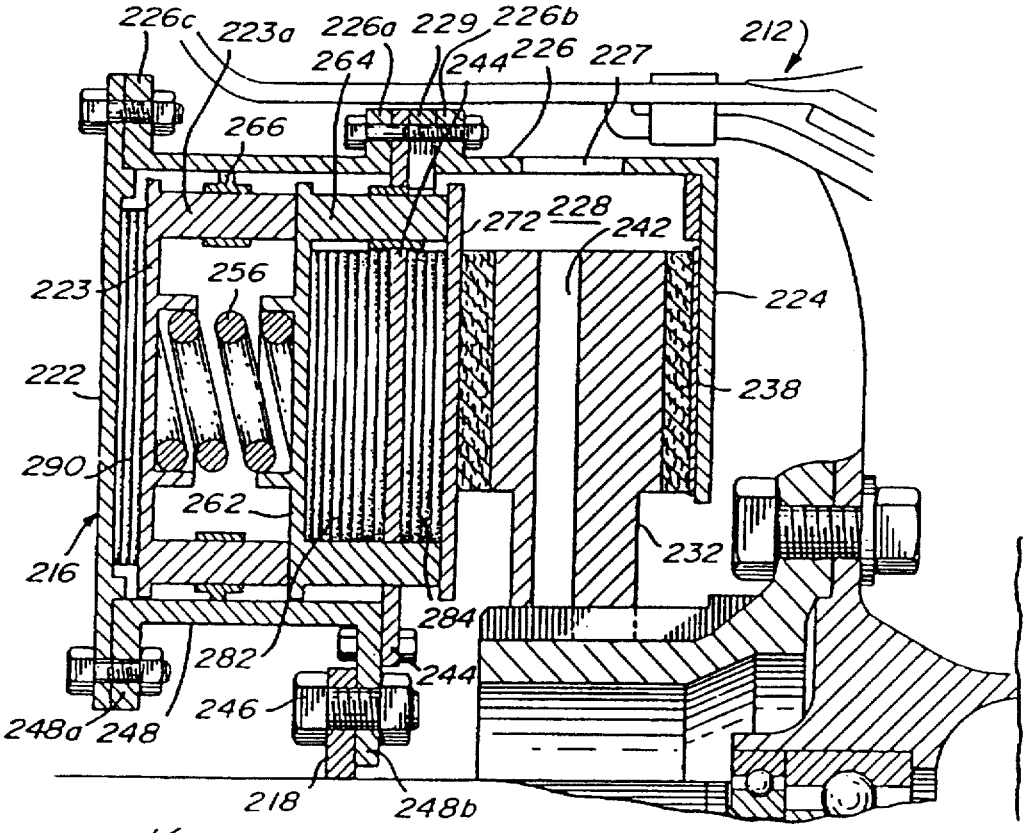
FIG. 4 is a fragmentary radial section of another embodiment of a detail of the present invention.

As shown in FIG. 4, the bladders 282 and 284, which are operated by air pressure, can be controlled to either act as a positive force to apply the brakes, that is, when air pressure is increased in bladder 284 and bladder 282 is deflated, or to remove the brakes against the force of spring 256 by increasing the air pressure in bladder 282 and deflating bladder 284. In the event that air is utilized to inflate the bladder 290, it would be connected to the air pressure system of the vehicle. This could permit automatic adjustment as the brake wear increases.

It is also contemplated that the bladder 84, 184, 284 in FIGS. 1, 2 and 4 respectively, could be located between the housing wall 24, 124, 224 and the backing plate for brake lining 38, 138, 238.

Instead of the bladder 290, the compensation for brake wear could be provided by the compensating ring 229. Ring 229 is a segmental ring which can easily be removed from between intermediate wall 244 and flange 226*b* of housing wall 226. A compensating ring (not shown) may be provided between intermediate wall 244 and flange 248*b*. The compensating ring 229 could also be placed between the housing wall 222 and the mounting flange 226*c* therefor. A compensating ring (not shown) would then be mounted between wall 222 and flange 248*a*. The idea is to allow for a decrease of the axial length of the housing 216 in order to compensate for wear of all parts of the braking system.

Figure 5:
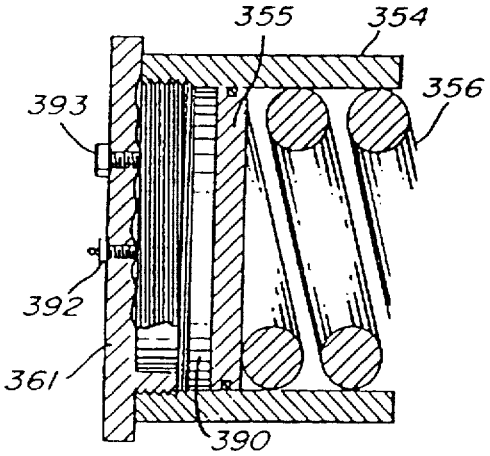
FIG. 5 is an enlarged fragmentary axial section showing still another embodiment of the detail shown in FIG. 4.

FIG. 5 shows an embodiment of the device for adjusting the spring length by increasing the force against the brake shoes or for compensating for brake wear. In embodiment shown, a grease nipple 392 in cap 361 can be utilized to insert grease or oil into the cavity 390 to displace the wall 355 in cylinder 354. When it is required to release the spring 356, the plug 393 can be released to allow the grease or oil to exit, thereby allowing the wall 353 to slide towards the cap 361.

Figure 6:
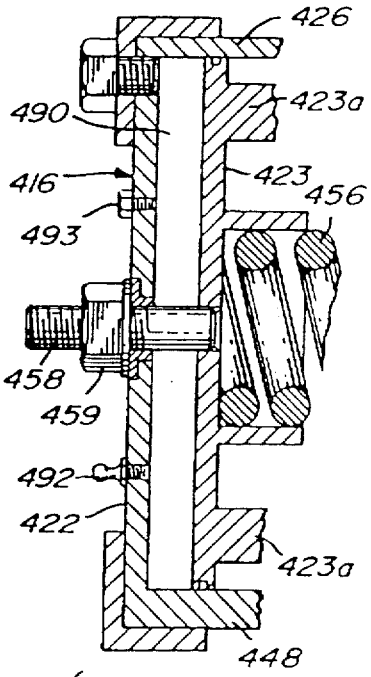
FIG. 6 is a further fragmentary enlarged axial section of another embodiment of the present invention.

Referring now to FIG. 6, there is shown another embodiment of a device for adjusting the spring length of the spring. The housing 416 includes a wall 422 and a sliding plate 423 defining a cavity 490 therebetween. A spring 456 engages against the plate 423, and a grease nipple 492 is provided on the wall 422 to allow grease or oil to be inserted into the cavity 490 to expand the cavity and thus move plate 423 against the spring 456. A bolt 458 is welded to plate 423, and a nut 459 can be rotated on the threads of the bolt 458 to adjust the maximum length of expansion permitted by the wall 423 and, therefore, of the cavity 490. Thus, on a multi-wheel truck, the brakes can be adjusted by providing a fluid in the cavities of each brake assembly, but torque adjustment can be provided on the bolt 458 to ensure that the brakes are not overcompensated on any one wheel.

The shell forming the housing is shown in the present embodiment as including several parts. It is contemplated that the concentric cylindrical walls 26, 48 and intermediate wall 44 in FIG. 1, for instance, can be cast in one piece.

We claim:

1. A disc brake assembly for a vehicle wheel on a vehicle, wherein the wheel includes a hub journaled to an axle on the vehicle, the disc brake assembly is within the confines of the wheel and concentric with the axle, the disc brake assembly including a housing mounted to the vehicle and a radial disc within the housing and means mounting the disc to the wheel, the disc having at least a first radial planar friction surface and a first brake shoe provided adjacent the first planar friction surface movable axially towards and away from the first friction surface of the disc for friction engagement therewith and release thereof, means provided for restraining the first brake shoe from rotating with the disc, an intermediate wall member mounted within the housing and fixed thereto extending parallel with the radial disc and located such that the first brake shoe moves axially between the intermediate wall and the radial disc, a movable spring abutment means mounted for axial movement within the housing between the intermediate wall and the housing wall such that the intermediate wall is between the movable spring abutment means and the first brake shoe, rigid pusher link members extending between the spring abutment means and the first brake shoe pass through the intermediate wall such that the [spring abutment means] *first brake shoe* [in unison,] axially with the [first brake shoe] *spring abutment means,* spring means extending between the housing wall and the spring abutment means such that the spring urges against the spring abutment means to press the first brake shoe against the first friction surface of the disc *in a safety brake mode,* and a first fluid bladder being provided between the intermediate wall and the spring abutment means whereby the first bladder, when expanded, forces the spring abutment means to overcome the spring means to release the first brake shoe from the first friction surface of the disc.

2. A disc brake assembly as defined in claim 1, wherein the first brake shoe includes a backing plate mounting brake linings, the backing plate extending parallel to the intermediate wall and being in direct contact with the link members.

3. A disc brake assembly as defined in claim [2] *1*, wherein a second fluid bladder is provided between the [backing plate] *brake shoe* and the intermediate wall such that, when the brakes are applied *in an active brake mode,* fluid pressure is applied to expand the second bladder [while means deflate the first bladder] so as to urge the first brake shoe against the first friction surface of the disc [and supplementing the action of the spring against the movable spring abutment means].

4. A disc brake assembly as defined in claim 1, wherein the radial disc is provided with a second radial friction surface on the other side of the disc relative to said first friction surface of the disc, and a second brake shoe is mounted within the housing adjacent the second friction surface of the disc, means are provided for restraining the second brake shoe from rotation with the disc, and the means for mounting the disc to the wheel includes an adapter sleeve fixed to the wheel and provided with axial splines such that the disc is capable of axial movement.

5. A disc brake assembly as defined in claim 1, wherein the intermediate wall member and the housing are mounted to a radial mounting ring mounted to the axle.

6. A disc brake assembly as defined in claim 1, wherein the housing means is an annular housing provided with a central axial opening through which the axle, extends therethrough, and a mounting ring in the form of an annular ring is mounted to the axle to which the housing and the intermediate wall are mounted, the disc mounting means includes an adapter sleeve having axial splines, the disc is an annular disc mounted on the axial splines of the adapter sleeve which extends from the wheel through a central opening of the disc.

7. A disc brake assembly as defined in claim 1, wherein a plurality of circumferentially spaced-apart spring means extends between the housing wall and the spring abutment means, and each spring means in the form of a coil spring having one end thereof received in a cylindrical sleeve mounted on said housing wall, and spring tension adjustment means are provided in the sleeve for adjusting the spring tension.

8. A disc brake assembly as defined in claim 7, wherein the spring adjustment means includes a cap member closing off an end of the sleeve on the housing wall, a coil spring abutment member is slidably movable within the sleeve, and an adjustment screw passes through the cap member and is associated with the coil spring abutment member in the sleeve for moving the coil spring abutment member to increase the tension of the spring means or to release the spring means.

9. A disc brake assembly as defined in claim 7, wherein the spring adjustment means includes a coil spring abutment member adapted to slide within the sleeve, and cap means are provided to close the sleeve and form a cavity between the cap means and the coil spring abutment member in the sleeve, and means for injecting a fluid within the cavity to move the coil spring abutment member between a position whereby tension is applied to the spring and spring release position.

10. A disc brake assembly as defined in claim 7, wherein the spring tension adjustment means includes a coil spring abutment member slidable within the sleeve and an expandable bladder is provided in the sleeve between the coil spring abutment member slidable in the sleeve and a cap at the end of the sleeve, means for supplying fluid into the bladder to expand the distance between the cap member and the coil spring abutment member to apply tension against the spring means and means to deflate the bladder so as to release the spring means.

11. A disc brake assembly as defined in claim 1, wherein the spring means includes a plurality of coil springs spaced apart circumferentially and a coil spring abutment member is located adjacent the housing wall and abutting against the coil springs, fluid chamber means provided between the housing wall and the coil spring abutment member whereby fluid can be introduced in the fluid chamber in order to slide the coil spring abutment member against the plurality of coil springs to adjust the tension thereof.

12. A disc brake assembly as defined in claim 11, wherein the expansion of the fluid chamber between the abutment member and the housing wall is limited by adjustment screw fixed to the coil spring abutment member and passing through the housing wall.

13. A disc brake assembly as defined in claim 1, wherein compensating means are provided in the form of a compensating ring supplementing the length of an axial cylindrical wall of the housing, and when the compensating ring is removed from the cylindrical wall, the axial length of the housing is reduced, thereby compensating for the wear on the brake shoe lining and the disc.

14. A disc brake assembly as defined in claim 13, wherein the housing includes an outer cylindrical, axially extending wall member having a pair of integral radial flanges to be bolted together, and a compensating ring between the flanges whereby, when it is required to reduce axial length of the housing to compensate for wear on the brake parts, the compensating ring is removed from the flanges of the cylindrical wall, and the flanges are bolted together.

15. A disc brake assembly as defined in claim 14, wherein the intermediate wall is also sandwiched between the flanges of the wall member.

16. A disc brake assembly as defined in claim 1, wherein the radial disc is provided with a second radial friction surface on the other side of the disc relative to the first friction surface, and a second brake shoe is mounted within the housing adjacent the second friction surface of the disc, [the first and second brake shoes each including a backing plate mounting brake linings,] a second fluid bladder is provided between one of the [backing plates] *brake shoes* and a fixed portion of the housing adjacent the [backing plates] *brake shoe* such that, when the brakes are applied *in the active mode,* fluid pressure is applied to expand the second bladder [while means deflate the first bladder] so as to urge one of the first and second brake shoes against a respective first and second friction surface of the disc [and supplementing the action of the spring against the spring abutment means].

*17. A disc brake assembly as defined in claim 3, wherein means are provided for deflating the first bladder so as to release the spring abutment means and allow the spring abutment means to supplement the action of the second bladder in an active brake mode.*

*18. A disc brake assembly as defined in claim 16, wherein means are provided for deflating the first bladder so as to release the spring abutment means and allow the spring abutment means to supplement the action of the second bladder in an active brake mode.*

* * * * *